(12) United States Patent
Ouichi (10) Patent No.: US 8,879,176 B2
(45) Date of Patent: Nov. 4, 2014

(54) LENS DEVICE

(71) Applicant: Fujifilm Corporation, Tokyo (JP)

(72) Inventor: Shunichiro Ouichi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/032,729

(22) Filed: Sep. 20, 2013

(65) Prior Publication Data

US 2014/0022653 A1 Jan. 23, 2014

Related U.S. Application Data (63) Continuation of application No. PCT/JP2012/056833, filed on Mar. 16, 2012.

(30) Foreign Application Priority Data

Mar. 23, 2011 (JP) .................................. 2011-064526

(51) Int. Cl.
*G02B 7/02* (2006.01)

(52) U.S. Cl.
USPC ............................ 359/823; 359/819; 359/822

(58) Field of Classification Search
USPC .................................. 359/694–704, 811–830
See application file for complete search history.

(56) References Cited

U.S. PATENT DOCUMENTS

| | | | |
|---|---|---|---|
| 4,687,297 A | 8/1987 | Kamata et al. | |
| 6,204,979 B1 | 3/2001 | Matsui | |
| 6,308,013 B1 | 10/2001 | Tanaka et al. | |
| 8,471,957 B2 * | 6/2013 | Iwasaki et al. | ................. 348/374 |
| 8,564,892 B2 * | 10/2013 | Honsho et al. | ................. 359/819 |

FOREIGN PATENT DOCUMENTS

| | | |
|---|---|---|
| JP | 61-4914 | 1/1986 |
| JP | 11-249216 | 9/1999 |
| JP | 11-337799 | 12/1999 |
| JP | 2000-075182 | 3/2000 |
| JP | 2004-361862 | 12/2004 |
| JP | 2008-152035 | 7/2008 |

OTHER PUBLICATIONS

International Search Report, PCT/JP2012/056833, Jun. 19, 2012.
Written Opinion, PCT/ISA/237, Jun. 19, 2012.

* cited by examiner

*Primary Examiner* — Mohammed Hasan
(74) *Attorney, Agent, or Firm* — Young & Thompson (57) ABSTRACT

A lens device according to an embodiment of the presently disclosed subject matter includes a first frame body where a first screw is formed, a second frame body where a second screw that can be screwed to the first screw is formed, the second frame body having a predetermined area of an outer perimeter where asperities are formed, an extender lens including a front optical system supported by the first frame body and a rear optical system supported by the second frame body, and a cylinder accommodating the first and second frame bodies and having formed thereon an opening for engaging a stick-shaped member inserted from the opening with the asperities from a diagonal direction when the first frame body is inserted in an optical axis.

8 Claims, 6 Drawing Sheets

RELATED ART

LENS DEVICE

CROSS-REFERENCE TO RELATED APPLICATIONS

This application is a PCT Bypass continuation application and claims the priority benefit under 35 U.S.C. §120 of PCT Application No. PCT/JP2012/056833 filed on Mar. 16, 2012 which application designates the U.S., and also claims the priority benefit under 35 U.S.C. §119 of Japanese Patent Application No. 2011-064526 filed on Mar. 23, 2011. which applications are all hereby incorporated in their entireties by reference.

BACKGROUND OF THE INVENTION

1. Field of the Invention

The presently disclosed subject matter relates to a lens device and, in particular, a technology of adjusting falling of a lens in a barrel.

2. Description of the Related Art

In a lens device of a broadcasting television camera, a variable power lens (an extender lens) is inserted as required along an imaging optical path of an imaging lens system (an optical system), thereby changing the magnifying power of an image. For example, with a 2× extender lens, by operating an operation lever or the like provided outside to place the extender lens in the imaging path, an image can be imaged as being magnified twofold.

Figure 6:
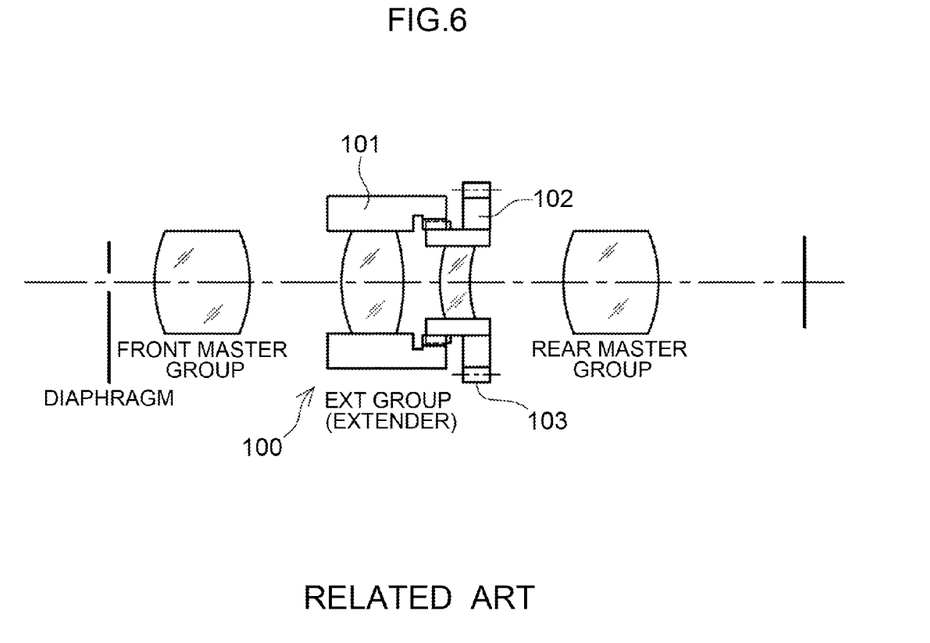
FIG. 6 depicts a conventional example.

As depicted in FIG. 6, an extender lens 100 is disposed between a front master group and a rear master group. The extender lens 100 includes a front optical system (lens group) and a rear optical system (lens group). The optical performance (optical characteristics) of the extender lens 100 can be adjusted by adjusting a space between the front lens group and the rear lens group along an optical axis direction. The space adjustment described above is performed by screwing a lens frame 101 holding the front lens group and a lens frame 102 holding the rear lens group together with a screw and rotating a gear wheel 103 formed on the outer perimeter of the lens frame 102 holding the rear lens group by using a jig or the like from outside.

However, this adjustment of the optical characteristics is performed after the extender lens is once removed from the optical axis. On the other hand, the results of adjustment of the optical characteristics are checked with the extender lens being on the optical axis. For this reason, to elaborate the optical characteristics, it is required to repeat the state in which the extender lens is inserted in the optical axis and the state in which the extender lens is removed from the optical axis, which poses a problem in which it takes some time and trouble.

Therefore, a technology capable of adjusting optical characteristics with the extender lens inserted in the optical axis has been desired. As a technology capable of adjusting the optical characteristics described above with the extender lens inserted in the optical axis, inventions are disclosed in Japanese Patent Application Laid-Open No. 2000-075182 and Japanese Patent Application Laid-Open No. 11-249216.

Japanese Patent Application Laid-Open No. 2000-075182 discloses an extender lens with a collar decentered with respect to a shaft center of a spindle being inserted into the spindle for inserting and removing the extender lens along and from an imaging optical path, the color inserted through a hole formed on a case body. For this extender lens, eccentricity can be adjusted by rotating the collar from outside of the case.

Japanese Patent Application Laid-Open No. 11-249216 describes that a gear is formed over an entire peripheral surface of a lens frame and, by rotating a rotating member engaged with this gear and exposed outside of a case, a lens is rotated about an optical axis to adjust eccentricity.

SUMMARY OF THE INVENTION

However, the inventions described in Japanese Patent Application Laid-Open No. 2000-075182 and Japanese Patent Application Laid-Open No. 11-249216 are to adjust eccentricity of an optical system and not to adjust a space in an optical axis direction in the optical system.

The presently disclosed subject matter was made in view of these circumstances, and has an object of providing a lens device capable of adjusting a space in an optical axis direction in an optical system divided into a front part and a rear part while an extender lens is inserted in the optical axis.

A lens device according to an embodiment of the presently disclosed subject matter includes an approximately cylindrical first frame body disposed so as to be able to be inserted in an removed from an optical axis, the first frame body having formed thereon a first screw with a predetermined length in an optical axis direction, an approximately cylindrical second frame body where a second screw that has a predetermined length in the optical axis direction and can be screwed to the first screw is formed, the second frame body having an outer perimeter where asperities with a predetermined length in a circumferential direction are formed, an extender lens configured of two optical systems, that is, a front part supported inside the first frame body and a rear part supported inside the second frame body, and a cylinder disposed so as to cover the first frame body and the second frame body and having formed thereon an opening for engaging a stick-shaped member with the asperities in a diagonal direction when the first frame body is inserted in the optical axis.

According to the lens device in accordance with the embodiment described above, to the first frame body where the first screw with the predetermined length in the optical axis direction is formed, the screw formed on the approximately cylindrical second frame body where the asperities with the predetermined length in the circumferential direction are formed on the outer perimeter is screwed. When the first frame body is inserted in the optical axis, the stick-shaped member is engaged with the asperities from the diagonal direction from the opening formed on the cylinder. Since the second frame body is screwed to the first frame body, the stick-shaped member can rotate the second frame body via the asperities. With this, with the extender lens being inserted in the optical axis, the space between the first frame body, that is, the front part, and the second body, that is, the rear part, in the optical axis direction can be adjusted. Also, when the jig is engaged straight from above the asperities, the jig abuts on an apex of the asperities and this impact possibly causes the second frame body to rotate, but by diagonally inserting the jig, it is possible to prevent the second frame body from unintentionally rotating.

In the lens device in accordance with the embodiment described above, the opening may be formed so that the optical axis and a straight line connecting the asperities and the opening and the optical axis form a gradient at approximately 45 degrees.

With this, the gradient formed between the optical axis and the straight line connecting the asperities and the opening is approximately 45 degrees, and the jig is engaged with the asperities diagonally at approximately 45 degrees. Therefore, the second frame body can be rotated most efficiently.

In the lens device in accordance with the embodiment described above, the opening may be formed to have a predetermined length in a circumferential direction so that an entirety of the second frame body in a radial direction can be viewed.

With this, the entire second frame body in the radial direction can be viewed. Therefore, the rotation amount of the second frame body can be easily grasped.

In the lens device in accordance with the embodiment described above, a wall covering an end face of the asperities may be formed on the outer perimeter of the second frame body, and the wall may be positioned at a back of the asperities when the asperities are viewed from the opening.

With this, the wall is formed at the back of the asperities when the asperities are viewed from the opening, and the end face of the asperities is covered with the wall. Therefore, the jig abuts on the wall when inserted, thereby facilitating the operation.

DETAILED DESCRIPTION OF THE EMBODIMENTS

Figure 1:
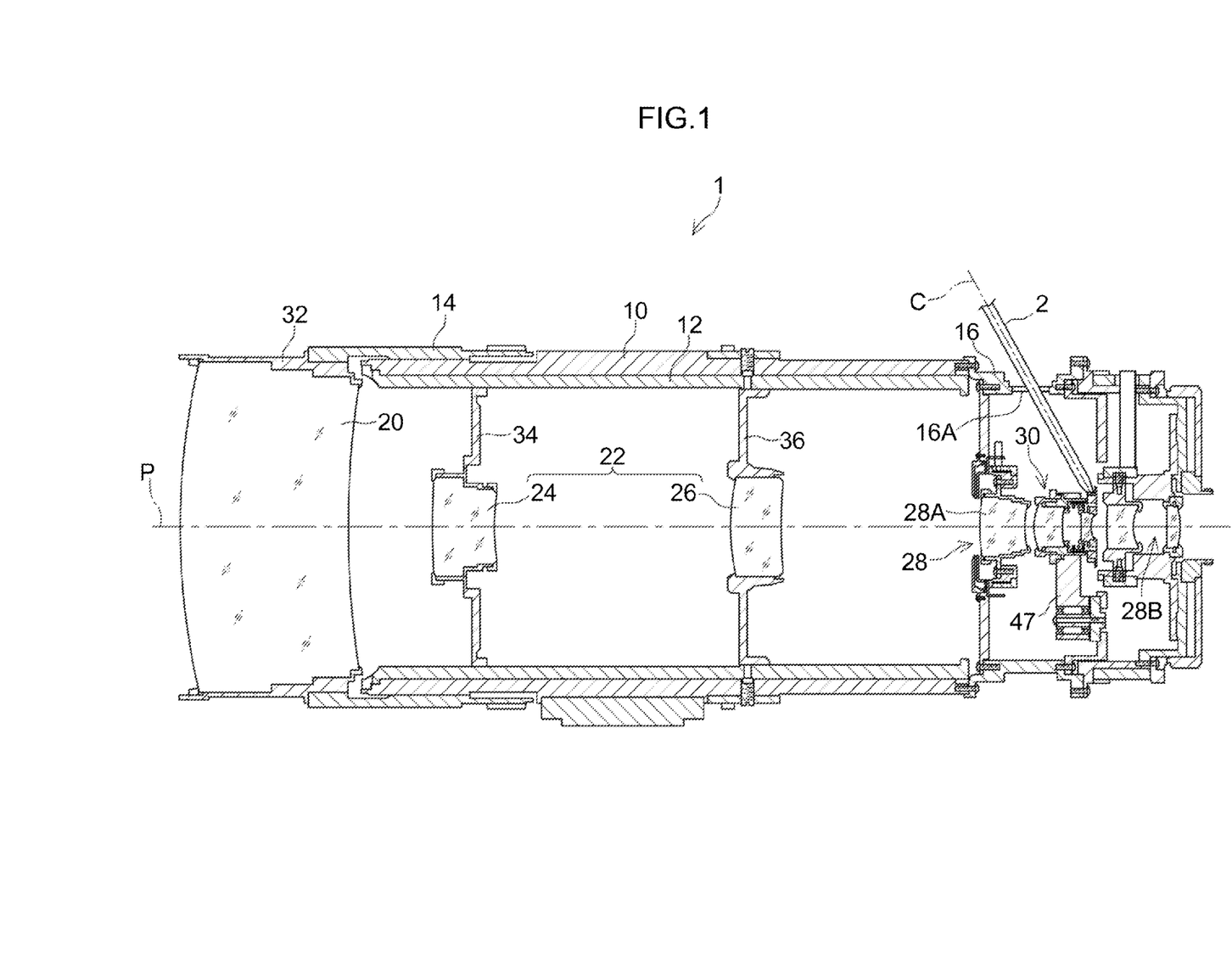
FIG. 1 is a schematic sectional view of a lens barrel according to a first embodiment of the presently disclosed subject matter sectioned along a plane including an optical axis.

Embodiments of the lens device according to the presently disclosed subject matter are described below according to the attached drawings. FIG. 1 is a schematic sectional view of a lens barrel 1 of a television camera imaging lens to which the presently disclosed subject matter is applied. FIG. 1 is a schematic sectional view of of the lens barrel 1 sectioned along a plane including an optical axis. A rear end (on a right side in FIG. 1) of the lens barrel 1 is mounted on a camera body not illustrated.

The lens barrel 1 has a focus lens group 20, a zoom lens group 22, and a master lens group 28 disposed therein. And, a diaphragm (not illustrated) is disposed between the zoom lens group 22 and the master lens group 28.

The focus lens group 20 includes three lenses, by way of example, and the lenses are supported by a focus lens barrel 32. The focus lens barrel 32 is supported by a body ring 10 via a ring 14 so as to freely move in a front and rear direction of an optical axis P. Therefore, when a focus ring (not illustrated) is rotated, the focus lens barrel 32 rotates accordingly, and the focus lens group 20 is driven in the front and rear direction of the optical axis P to perform a focus adjustment.

On the other hand, a cam cylinder 12 is rotatably disposed in the body ring 10. When a zoom ring (not illustrated) is rotated, the cam cylinder 12 also rotates accordingly.

Inside the cam cylinder 12, the zoom lens group 22 is disposed. The zoom lens group 22 includes a variable power lens 24 having a negative refracting power for magnification and a correcting lens 26 for correcting an image surface fluctuating with magnification.

The variable power lens 24 is held in a variable lens frame 34. In the variable lens frame 34, a cam pin (not illustrated) fits, and this cam pin penetrates through a cam groove (not illustrated) formed on the cam cylinder 12 to fit in a rectilinear groove (not illustrated) formed on an inner circumferential surface of the body ring 10. The correcting lens 26 is held in a correcting lens frame 36. In the correcting lens frame 36, a cam pin (not illustrated) fits, and this cam pin penetrates through a cam grooves (not illustrated) formed on the cam cylinder 12 to fit in a rectilinear groove (not illustrated) formed on the inner circumferential surface of the body ring 10. For this reason, when the cam cylinder 12 is rotated, the variable power lens 24 and the correcting lens 26 are driven in the front and rear direction of the optical axis P to perform a zoom adjustment.

Figure 2:
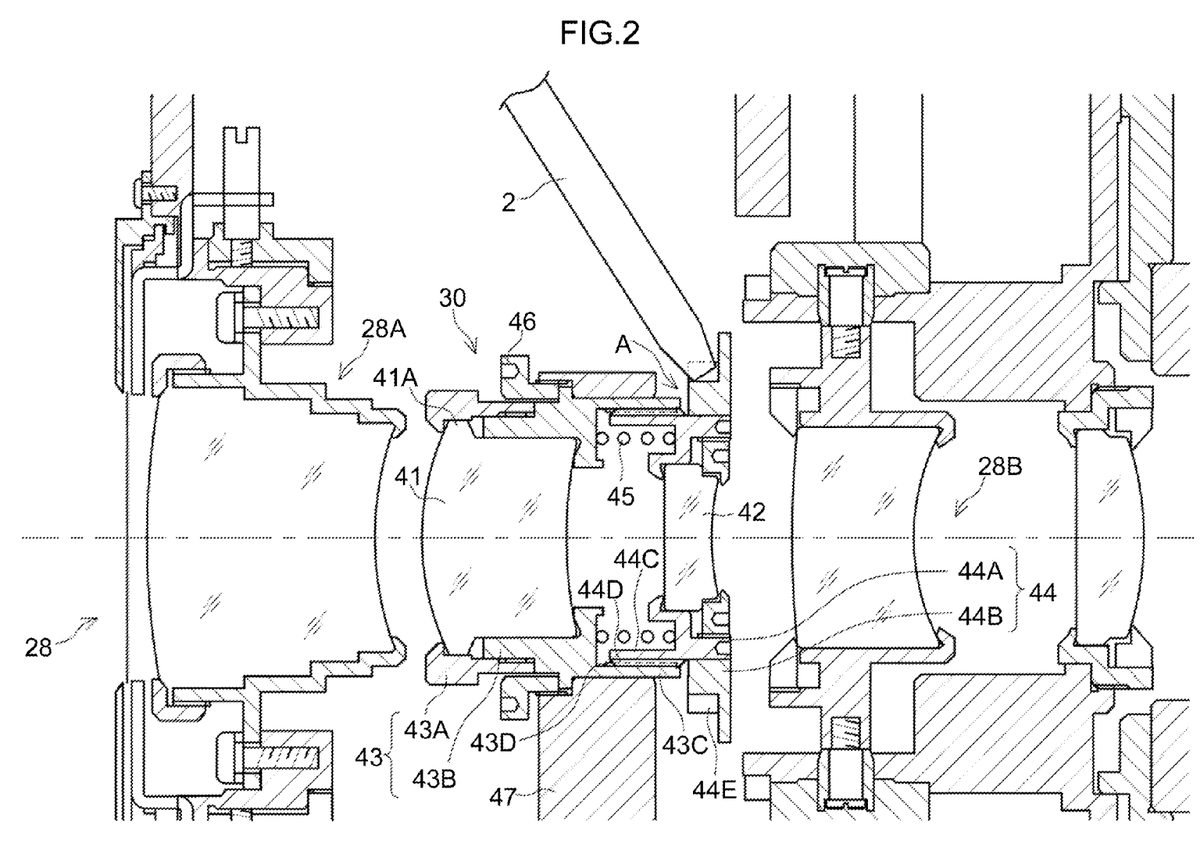
FIG. 2 is a partially enlarged view of the lens barrel.

FIG. 2 is an enlarged view of the master lens group 28. The master lens group 28 includes a front master group 28A and a rear master group 28B. The master lens group 28 is movably disposed along the optical axis. By moving the master lens group 28 along the optical axis, focus correction is performed. Also, the movement of the master lens group 28 is controlled upon performing fine adjustment of a lens imaging position (which is also referred to tracking adjustment or flange focal length adjustment) and a macro photography.

Between the front master group 28A and the rear master group 28B, an extender group 30 for switching an imaging magnifying power between one and a predetermined number (for example, two) is disposed on the optical axis so as to be insertable and removable therealong and therefrom. When the focal length range is switched by inserting and removing the extender group 30 along and from the optical axis, there is an advantage that the lens full length and back focus do not change, and in addition, there is an advantage that switching can be made instantaneously.

The extender group 30 includes a front lens group 41 of a positive refractive power as a whole disposed on an object side (on a left side in FIG. 2) and a rear lens group 42 of a negative refractive power as a whole disposed on an image surface side (on a right side in FIG. 2).

The front lens group 41 is supported by an approximately cylindrical front lens frame 43. The front lens frame 43 includes a nail part 43A and a body part 43B. The front lens group 41 has a projecting part 41A formed on the object side and supported inside the approximately cylindrical nail part 43A. Also, the outer perimeter of the front lens group 41 is supported by the inside of the approximately cylindrical body part 43B. The body part 43B has an approximately cylindrical thin-walled part 43C formed so as to project to a rear side (the right side in FIG. 2). The thin-walled part 43C has an inner diameter part where a screw part 43D is formed.

The rear lens group 42 is supported by an approximately cylindrical rear lens frame 44. The rear lens frame 44 includes an approximately cylindrical body part 44A supporting therein the rear lens group 42 and a flange part 44B screwed and coupled to a rear end side of the body part 44A. The body part 44A has an approximately cylindrical thin-walled part 44C formed so as to project to the object side. The thin-walled part 44C has an outer diameter where a screw part 44D screwed to the screw part 43D is formed. Also, the flange part 44B has an outer perimeter where an adjustment gear wheel 44E is formed.

With the screw part 44D and the screw part 43D being screwed together, the front lens frame 43 and the rear lens frame 44 are assembled with a predetermined space apart from each other in the optical axis direction. Between the front lens frame 43 and the rear lens frame 44, a coil spring 45 pressing the front lens frame 43 to the object side and pressing the rear lens frame 44 to the image surface side is disposed. With this, the front lens frame 43 and the rear lens frame 44 are fixed together so as not to rattle.

The body part 43B of the front lens frame 43 is disposed at a front end of an arm 47 by an annular member 46. The arm 47 is rotatably disposed on a coupling ring 16 (refer to FIG. 1) fixed to the body ring 10. When the arm 47 is rotated, the extender group 30 is inserted in and removed from the optical axis with the movement of the front lens frame 43.

The space between the front lens group 41 and the rear lens group 42 of the extender group 30 can be adjusted by changing the amount of screwing of the screw part 44D and the screw part 43D. In general, as the space between the front lens group 41 and the rear lens group 42 is wider, the structure becomes such that the refractive power of each lens group is decreased and aberration tends to occur less. For this reason, the structure is such that the optical performance (optical characteristics) can be adjusted by adjusting the space between the front lens group 41 and the rear lens group 42.

Note that the diameter of the thin-walled part 43C may be made smaller than the diameter of the thin-walled part 44C to form a screw part to be screwed onto each of the outer diameter of the thin-walled part 43C and the inner diameter of the thin-walled part 44C. Also, the rear lens frame 44 may be disposed on the arm 47, and an adjustment gear wheel may be provided to the front lens frame 43 to allow the front lens frame 43 to rotate with respect to the rear lens frame 44.

In the lens barrel 1 of the present embodiment, the optical performance of the extender group 30 can be adjusted with the extender group 30 inserted in the optical axis. In the following, adjustment of the optical performance (optical characteristics) with the extender group 30 inserted in the optical axis is described.

Figure 3:
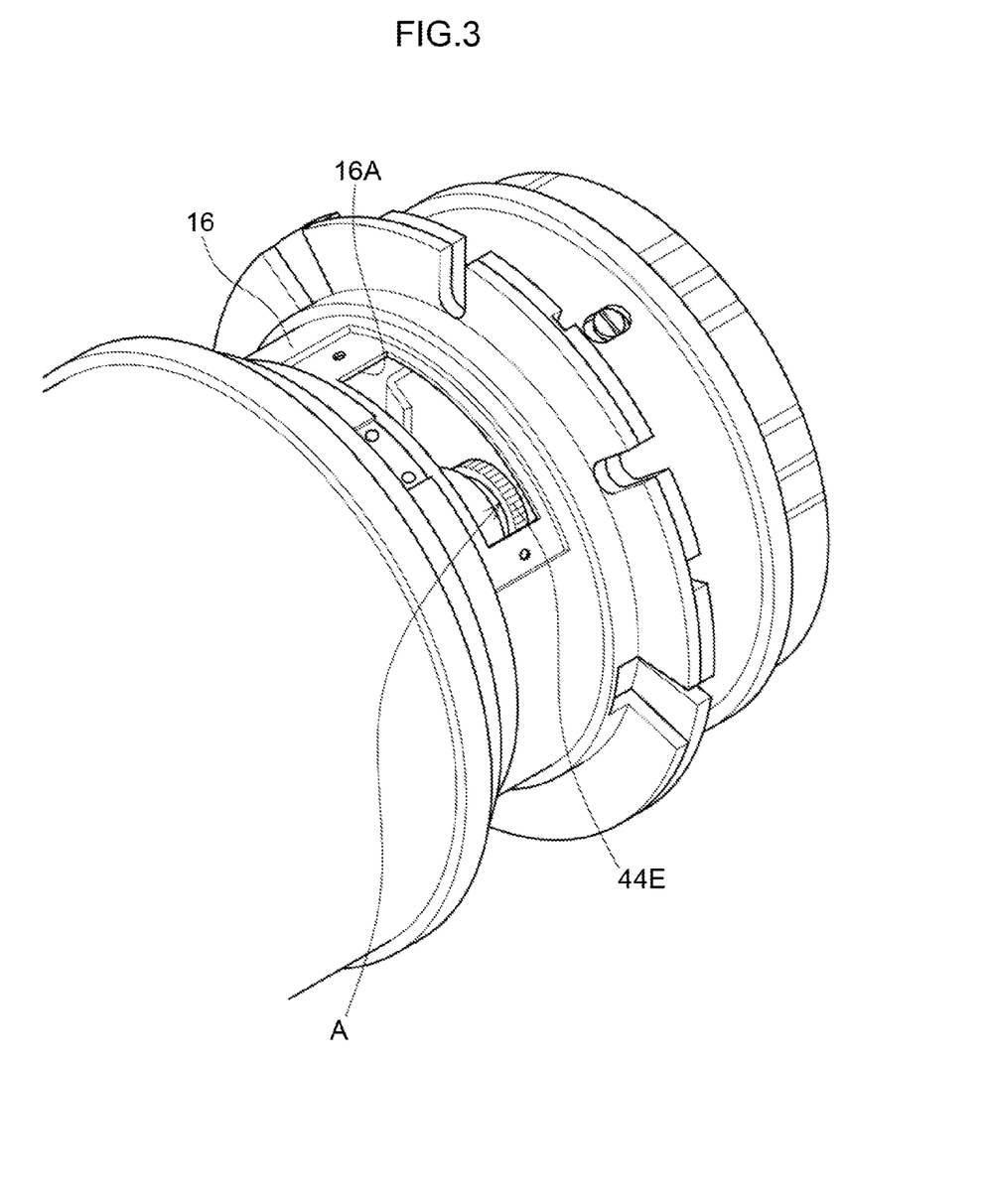
FIG. 3 is a partial perspective view of the lens barrel.

As depicted in FIG. 1 and FIG. 3, an opening 16A is formed on the approximately cylindrical coupling ring 16 coupled to the body ring 10. As depicted in FIG. 1, the opening 16A is formed so that the position of the opening 16A in the optical axis direction is different from the position of the adjustment gear wheel 44E in the optical axis direction. Also, as depicted in FIG. 3, from the opening 16A, the whole of the adjustment gear wheel 44E and the rear lens frame 44 in a radial direction can be viewed from a diagonal direction.

As depicted in FIG. 1, a jig 2 is obliquely inserted from the opening 16A, and a front end of the jig 2 is engaged between teeth (in a groove between teeth) of the adjustment gear wheel 44E from a diagonal direction at approximately 45 degrees (45±10 degrees). In other words, the opening 16A is formed so that the angle between a center axis C of the jig 2 and the optical axis P form an approximately 45 degrees (45±10 degrees). With this, the jig 2 can be operated as viewing the adjustment gear wheel 44E. Also, when the jig 2 is engaged straight above the adjustment gear wheel 44E, the jig 2 abuts on a teeth tip, and this impact possibly causes the adjustment gear wheel 44E, that is, the rear lens frame 44, to rotate, but by diagonally inserting the jig 2, it is possible to prevent the rear lens frame 44 from unintentionally rotating. Note that the direction in which the jig 2 is to be inserted is any as long as the direction is diagonal, and is not restricted to be diagonal at approximately 45 degrees (45±10 degrees). However, in view of facilitating application of a force to rotate the adjustment gear wheel 44E by operating the jig 2, the direction diagonally at approximately 45 degrees (45±10 degrees) is most preferable.

With the front end of the jig 2 engaged between teeth of the adjustment gear wheel 44E, the adjustment gear wheel 44E is rotated. Since the jig 2 is diagonally inserted, the engagement between the front end of the jig 2 and the adjustment gear wheel 44E is favorable, the adjustment gear wheel 44E can be easily rotated, and the rotation amount of the adjustment gear wheel 44E, that is, the rotation amount of the rear lens frame 44, can be easily grasped.

When the rear lens frame 44 is rotated as described above, the amount of screwing between the screw part 43D and the screw part 44D is changed. With this, the space between the front lens frame 43 and the rear lens frame 44 in the optical axis direction, that is, the space between the front lens group 41 and the rear lens group 42 in the optical axis direction, is changed, thereby adjusting the optical axis performance.

After the rear lens frame 44 is rotated by a desired amount, the optical performance of the lens barrel 1 is checked. Since the extender group 30 is kept inserted in the optical axis in the present embodiment, it is not required to take time and trouble to insert the extender group 30 in the optical axis in checking the optical performance. Also, even if adjustment of the front lens frame 43 and the rear lens frame 44 in the optical axis direction is again required as a result of checking the optical performance, it is not required to take time and trouble to remove the extender group 30 from the optical axis.

When the adjustment of the optical performance ends, a bonding agent is injected into a screwed portion between the screw part 43D and the screw part 44D (an A portion in FIG. 2 and an A portion in FIG. 3) to bond the front lens frame 43 and the rear lens frame 44. The bonding agent is injected from the opening 16A. Since the opening 16A is different from the adjustment gear wheel 44E and the screwed portion between the screw part 43D and the screw part 44D in position in the optical axis direction, the bonding agent is diagonally injected from the opening 16A. For this reason, a bonding-agent injecting work is easier to perform compared with the case in which the opening 16A is located straight above the screwed portion between the screw part 43D and the screw part 44D.

After bonding, the opening 16A is covered with a lid (not illustrated). With this, the work of adjusting the optical performance of the extender group 30 is all completed.

According to the present embodiment, with the extender group 30 being inserted in the optical axis, the space between front lens frame 43 and the rear lens frame 44 in the optical axis direction can be performed. For this reason, it is possible to omit time and trouble to insert and remove the extender group 30 along and from the optical axis at the time of adjusting the optical axis performance of the extender group 30. Also, since the positions of the opening 16A and the adjustment gear wheel 44E in the optical axis direction are varied and the jig 2 is engaged with the optical axis direction from a diagonal direction, the work of adjusting the space between the front lens frame 43 and the rear lens frame 44 in the optical axis direction can be easily performed.

In the present embodiment, although the opening 16A is disposed on the object side (the left side in FIG. 2) with respect to the adjustment gear wheel 44E and the screwed portion between the screw part 43D and the screw part 44D, the opening 16A may be disposed on a rear side (the right side in FIG. 2) of the adjustment gear wheel 44E and the screwed portion between the screw part 43D and the screw part 44D.

Figure 4:
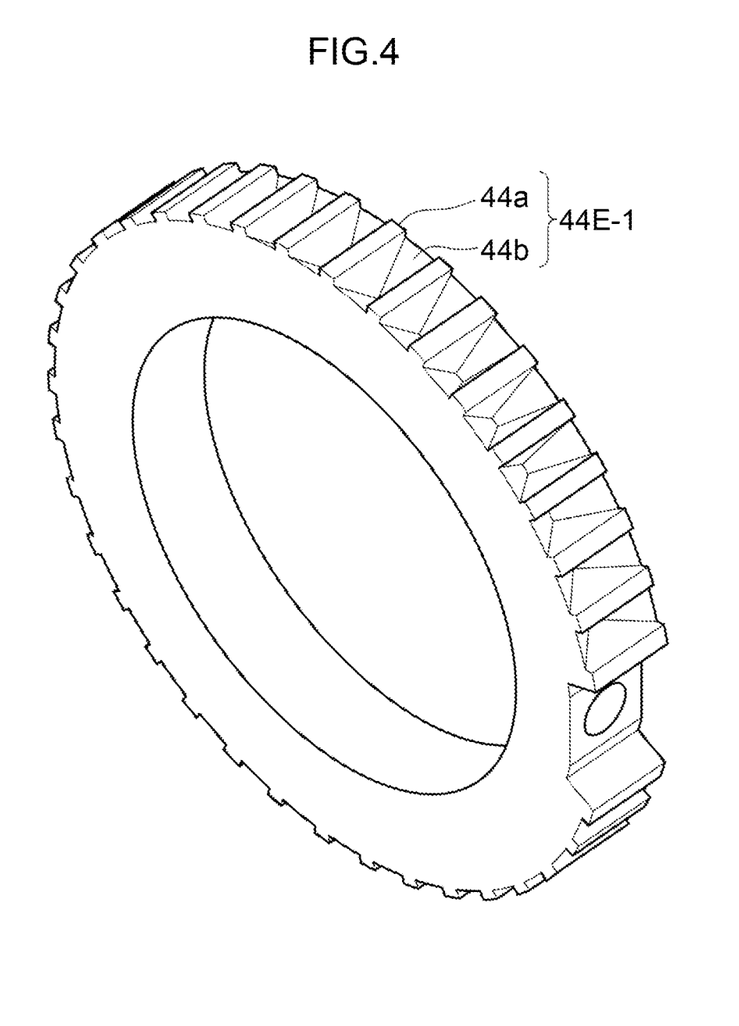
FIG. 4 is a partial perspective view of an adjustment gear wheel of another embodiment.

Also, while the adjustment gear wheel 44E is formed on the outer perimeter of the rear lens frame 44 to rotate the rear lens frame 44 in the present embodiment, a gear wheel is not necessarily required. Asperities may be formed in any manner as long as the front end of the jig 2 can be engaged. FIG. 4 depicts an example in which holes with which the front end of the jig 2 can be engaged are formed. Adjustment asperities 44E-1 are configured of projecting portions 44a and holes 44b each in an approximately quadrangular-pyramidal shape, and the front end of the jig can be engaged with any of the holes 44*b*. Note that the shape of the hole is not restricted to the approximately quadrangular-pyramidal shape.

Figure 5:
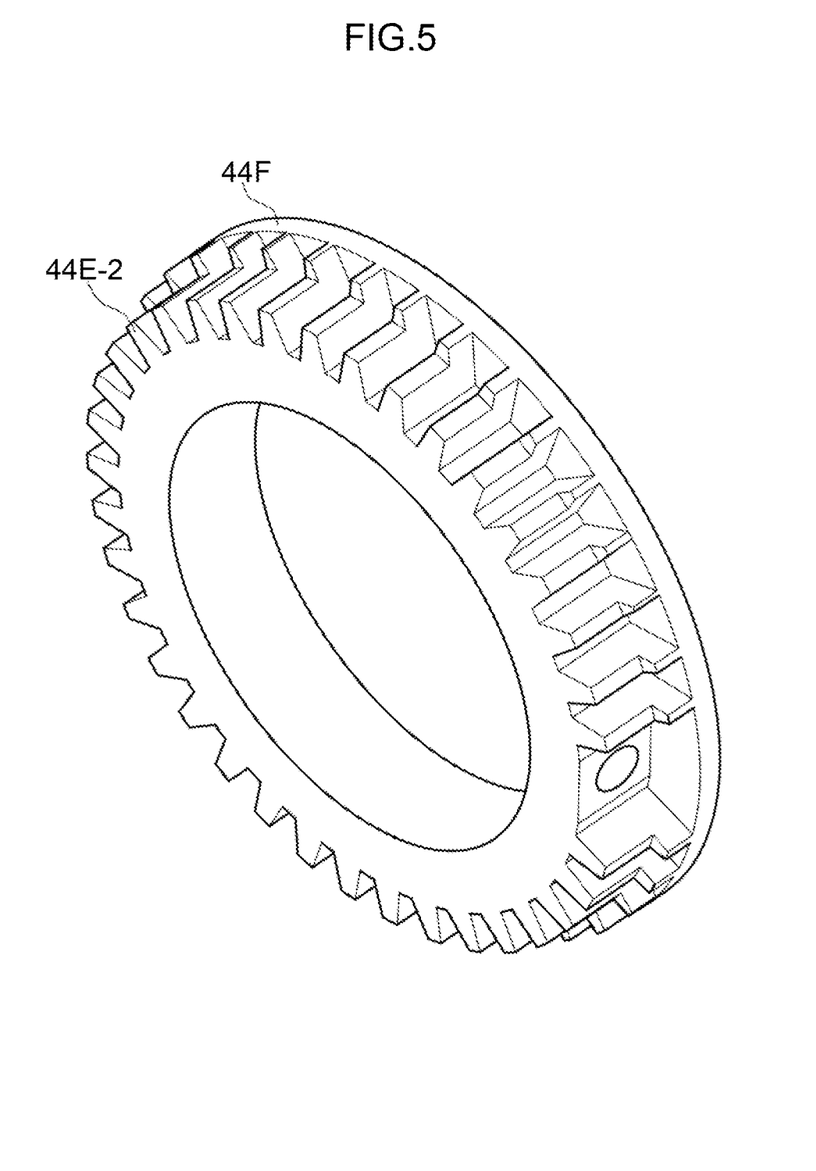
FIG. 5 is partial perspective view of an adjustment gear wheel of still another embodiment.

Furthermore, while the adjustment gear wheel 44E is formed as asperities in the present embodiment, a wall 44F may be formed on a rear side (the right side in FIGS. 1 and 2) of the adjustment gear wheel 44E-2 as asperities, as depicted in FIG. 5. With this, the wall 44F serves as a stopper, where the front end of the jig 2 abuts, thereby preventing the jig 2 from sliding from a recessed part (here, an adjustment gear wheel 44E-2) to release the engagement. Note that, in the present embodiment, since the opening 16A is formed on the object side with respect to the position of the adjustment gear wheel 44E-2 in the optical axis direction, the wall 44F is formed on the rear side of the adjustment gear wheel 44E-2, but the presently disclosed subject matter is not restricted to this. That is, since it is enough for the wall to be positioned at the back of the position of the adjustment gear wheel 44E-2 when the adjustment gear wheel 44E-2 is viewed from the opening 16A, if the opening 16A is formed on the rear side with respect to the position of the adjustment gear wheel 44E-2 in the optical axis direction, the wall 44F is formed on the object side with respect to the adjustment gear wheel 44E-2.

Note that the method of preventing the engagement between the jig and the recessed part from being released is not restricted to the method of forming a wall on the adjustment gear wheel as depicted in FIG. 5, and the bottom of the recessed part may have an approximately V shape, as depicted in FIG. 4.

Also, while the adjustment gear wheel 44E is formed over the entire perimeter in the present embodiment, asperities may be formed only on a half of the perimeter on an upper side required for adjustment or only on part of the upper side.

Furthermore, while the opening 16A with a size allowing the entirety of the adjustment gear wheel 44E, that is, the rear lens frame 44, in the radial direction to be viewed is formed in the present embodiment, a minimum size of the opening is such that part of the rear lens frame 44 can be viewed. However, it is preferable that the entire diameter of the rear lens frame 44 be viewed, because the rotation amount and others can be easily grasped.

What is claimed is:

1. A lens device comprising:
   a cylindrical first frame body where a first screw is formed;
   a cylindrical second frame body where a second screw that can be screwed to the first screw is formed, the second frame body having a predetermined area of an outer perimeter where asperities are formed;
   an extender lens including a front optical system supported by the first frame body and a rear optical system supported by the second frame body, the extender lens being disposed so as to be able to be inserted in and removed from an optical axis; and
   a cylinder accommodating the first frame body and the second frame body and having an opening formed thereon, the opening being arranged such that a stick-shaped member inserted from the opening is engaged with the asperities in a diagonal direction when the first frame body is inserted in the optical axis.

2. The lens device according to claim 1, wherein the opening is formed so that an angle formed by a straight line connecting the asperities and the opening and the optical axis is approximately 45 degrees.

3. The lens device according to claim 1, wherein the opening is formed to have a predetermined length in a circumferential direction of the second frame body so that an entirety of the second frame body in a radial direction can be viewed.

4. The lens device according to claim 2, wherein the opening is formed to have a predetermined length in a circumferential direction of the second frame body so that an entirety of the second frame body in a radial direction can be viewed.

5. The lens device according to claim 1, further comprising a wall formed on the outer perimeter of the second frame body and positioned at a back of the asperities when the asperities are viewed from the opening.

6. The lens device according to claim 2, further comprising a wall formed on the outer perimeter of the second frame body and positioned at a back of the asperities when the asperities are viewed from the opening.

7. The lens device according to claim 3, further comprising a wall formed on the outer perimeter of the second frame body and positioned at a back of the asperities when the asperities are viewed from the opening.

8. The lens device according to claim 4, further comprising a wall formed on the outer perimeter of the second frame body and positioned at a back of the asperities when the asperities are viewed from the opening.

* * * * *